United States Patent [19]
Reddy et al.

[11] Patent Number: 5,855,936
[45] Date of Patent: Jan. 5, 1999

[54] FOOD FORTIFICATION

[75] Inventors: Sekhar Reddy, New Milford; Elaine Regina Wedral, Sherman; Dharam Vir Vadehra; Li Li Zyzak, both of New Milford, all of Conn.

[73] Assignee: Nestec S.A., Vevey, Switzerland

[21] Appl. No.: 822,447

[22] Filed: Mar. 21, 1997

[51] Int. Cl.$^6$ ............ A23L 1/0532; A23L 1/053; A23L 1/304
[52] U.S. Cl. ............ 426/74; 426/522; 426/573; 426/575; 426/580; 426/588; 426/590; 426/660
[58] Field of Search ............ 426/580, 74, 590, 426/573, 575, 588, 660, 522

[56] References Cited

U.S. PATENT DOCUMENTS

| | | | |
|---|---|---|---|
| 2,871,123 | 1/1959 | Bauer et al. | 426/580 |
| 4,180,595 | 12/1979 | Lauredan | 426/575 |
| 4,834,990 | 5/1989 | Amer | 426/74 |
| 5,609,897 | 3/1997 | Chandler et al. | 426/74 |

*Primary Examiner*—Helen Pratt
*Attorney, Agent, or Firm*—Pennie & Edmonds LLP

[57] ABSTRACT

A fortified foodstuff comprising a fortifying amount of a blend of calcium salts balanced with soluble and insoluble salts stabilized with a source of glucuronic acid and a process for its preparation by forming a preparation of the blend of calcium salts, contacting this preparation with a source of glucuronic acid, and adding it to the foodstuff.

19 Claims, No Drawings

FOOD FORTIFICATION

FIELD OF THE INVENTION

The present invention relates to the fortification of food and more particularly to the fortification of food with calcium.

BACKGROUND OF THE INVENTION

Calcium is an important element in human diets for adequate bone formation and maintenance as well as other metabolic functions, e.g. nerve transmission, blood clotting, proper cell function and muscle contraction. It is common practice to fortify food products with calcium sources which are either insoluble or soluble at around neutral pH. Many of the calcium sources currently used for fortification which are insoluble or substantially insoluble at around neutral pH, e.g. calcium carbonate, calcium phosphates, calcium citrate and other organic acid salts of calcium, result in precipitation and a chalky mouth feel. Other calcium sources which are soluble or substantially soluble at around neutral pH such as calcium chloride, calcium hydroxide and a few organic acid salts of calcium react with milk proteins resulting in undesirable coagulation and sedimentation.

It is also common practice to stabilize or reduce the sedimentation of the calcium and milk proteins in the milk beverages fortified with calcium sources by adding carrageenans, pectins and/or other gums, but such materials impart an undesirably high viscosity to milk. Protein destabilization, e.g. precipitation and coagulation, is mainly attributed to free calcium ions in the system.

It would be highly desirable to have a calcium source to fortify milk beverages and other dairy based products without coagulation and sedimentation, with improved palatability.

SUMMARY OF THE INVENTION

We have developed a blend of calcium salts balanced with soluble and insoluble salts stabilized with a source of glucuronic acid which is capable of fortifying milk beverages and other dairy based products without coagulation and sedimentation, and with improved palatability.

According to the present invention, there is provided a fortified foodstuff comprising a fortifying amount of a blend of calcium salts balanced with soluble and insoluble salts stabilized with a source of glucuronic acid.

DETAILED DESCRIPTION OF THE INVENTION

The foodstuff may be a dairy based product such as a milk beverage, a confectionery product, ice cream or another beverage such as a juice.

Examples of the soluble calcium salts are calcium lactate and calcium gluconate, calcium glycerophosphate, calcium chloride, etc. Examples of the insoluble calcium salts are tricalcium phosphate, dicalcium phosphate, calcium citrate and calcium carbonate. The weight ratio of soluble to insoluble salts may be from about 1:3 to 3:1 and preferably from 1.5:2.5 to 2.5:1.5.

The amount of the blend of calcium salts present in the fortified foodstuff may be from about 0.05 to 5%, preferably from 0.1 to 2.5%, and more preferably from 0.2 to 1.0% by weight based on the weight of the foodstuff.

The source of glucuronic acid may be gum ghatti but is preferably gum arabic. The amount of gum arabic present in the fortified foodstuff may be from about 0.05 to 2.5%, preferably from 0.1 to 1.0%, and more preferably from 0.2 to 0.5% by weight based on the weight of the foodstuff. Although not wishing to be bound by theory, we believe that the glucuronic acid residues in gum arabic aid in suspending calcium by ionic binding without contributing significantly to viscosity.

Advantageously, a carrageenan may be present which may be the lambda- or iota-form but is preferably kappa-carrageenan. The amount of carrageenan present in the fortified foodstuff may be from about 0.005 to 0.1%, preferably from 0.1 to 0.05%, and more preferably from 0.02 to 0.04% by weight based on the weight of the foodstuff.

The fortified foodstuff comprising a fortifying amount of a blend of calcium salts balanced with soluble and insoluble salts together with a source of glucuronic acid may be prepared by forming a preparation of the blend of calcium salts, contacting this preparation with a source of glucuronic acid, and adding the preparation to the foodstuff.

The blend of calcium salts and the source of glucuronic acid may be added in the form of aqueous solutions or suspensions or as dry powders.

Advantageously, a carrageenan may be added to the foodstuff, preferably before the preparation of the blend of calcium salts is added to the foodstuff. The carrageenan may also be added to the foodstuff in the form of an aqueous solution or suspension or as a dry powder.

If desired, the blend of calcium salts, the source of glucuronic acid, and optionally the carrageenan, may be co-dried and added as a powder. The drying may be carried out by various methods known to those skilled in the art.

EXAMPLES

The following Examples further illustrate the present invention.

Example 1

The following solutions/suspensions are prepared:
A. 1. 155 g of calcium lactate in 79.9 ml water.
B. 1.19 g of calcium citrate in 50 ml water.
C. 0.52 g of tri-calcium phosphate in 40 ml water.
D. The solutions/suspensions of A,B, and C are mixed for 10 minutes to give a calcium salt blend.
E. 2.5 g of gum arabic are dispersed in 100 g of water and hydrated thoroughly.
F. 0.15 g of kappa carrageenan (Sea Kem CM611) is added to 830 g of skim milk with skim milk powder added for adjusting the milk solids to take into account the additional water of the solutions/suspensions in the final product.
G. The calcium salt blend D is added to the gum solution E and mixed for 10 minutes.
H. The calcium salt and gum arabic solution blend G is added to the milk and carrageenan blend F to prepare the final product and the pH adjusted to 6.6–7.0.

The final product is UHT sterilized and homogenized. The milk was stable without any sedimentation during storage at 2° to 5° C. and at room temperature.

Example 2

A. 1.155 g of calcium lactate, 1.19 g of calcium citrate and 0.5 g of calcium carbonate are dry blended.
B. 0.15 g of kappa carrageenan and 2.5 g of gum arabic are added to 994.5 g of cold milk.

C. The calcium blend A is added to the blend of milk containing the carrageenan and gum arabic and the pH is adjusted to 6.6–7.0.

The final product is UHT sterilized and aseptically filled. The milk was stable without any sedimentation during storage at 2° to 5° C. and at room temperature.

Comparative Example A

A similar procedure to that described in Example 1 is followed but omitting the addition of the gum arabic and kappa carrageenan.

The UHT sterilized and homogenized milk was not stable during processing and there was significant precipitation.

Comparative Example B

A similar procedure to that described in Example 2 is followed but omitting the addition of the gum arabic.

The milk was stable during the processing but significant sedimentation occurred upon storage at 2° to 5° C. after 5 weeks.

What is claimed is:

1. A fortified foodstuff comprising a fortifying amount of a balanced blend of soluble and insoluble calcium salts together with a source of glucuronic acid, wherein the soluble and insoluble calcium salts are present in a weight ratio of from 1:3 to 3:1.

2. A fortified foodstuff according to claim 1 wherein the foodstuff is a dairy based product, a confectionery product, an ice cream or a beverage.

3. A fortified foodstuff according to claim 1 wherein the soluble calcium salts are one or more of calcium lactate, calcium gluconate, calcium glycerophosphate or calcium chloride.

4. A fortified foodstuff according to claim 1 wherein the insoluble calcium salts are one or more of tricalcium phosphate, dicalcium phosphate, calcium citrate or calcium carbonate.

5. A fortified foodstuff according to claim 1 wherein the amount of the blend of calcium salts present in the fortified foodstuffs from about 0.05 to 5% by weight based on the weight of the foodstuff.

6. A fortified foodstuff according to claim 1 wherein the source of glucuronic acid is gum arabic.

7. A fortified foodstuff according to claim 1 wherein the amount of gum arabic present in the fortified foodstuff is from about 0.05 to 2.5% by weight based on the weight of the foodstuff.

8. A fortified foodstuff according to claim 1 wherein a carrageenan is also present.

9. A fortified foodstuff according to claim 8 wherein the amount of carrageenan present in the fortified foodstuff is from about 0.005 to 0. 1% by weight based on the weight of the foodstuff.

10. A fortified foodstuff according to claim 1 wherein the weight ratio of soluble to insoluble calcium salts is between 1.5:2.5 and 2.5:1.5.

11. A process for preparing a fortified foodstuff comprising a fortifying amount of a balanced blend of soluble and insoluble calcium salts together with a source of glucuronic acid, which comprises forming a preparation of the blend of the calcium salts, contacting this preparation with a source of glucuronic acid, and adding the resulting combination to the foodstuff, wherein the soluble and insoluble calcium salts are present in a weight ratio of from 1:3 to 3:1.

12. A process according to claim 11 wherein the blend of calcium salts and the sourc of glucuronic acid are added in the form of aqueous solutions or suspensions or as dry powders.

13. A process according to claim 11 wherein a carrageenan is also added to 3the foodstuff.

14. A process according to claim 13 wherein the carrageenan is added to the foodstuff in the form of anaqueous solution or suspension or as a dry powder.

15. A process according to claim 11 wherein the blend of calcium salts, the source of glucuronic acid, and optionally a carrageenan, is co-dried and added as a powder.

16. A process according to claim 11 wherein the weight ratio of soluble to insoluble calcium salts is between 1.5:2.5 and 2.5:1.5.

17. A process according to claim 11, wherein the source of glucuronic acid is gum arabic and the calcium salts and gum arabic are added to the foodstuff in the form of an aqueous solution or suspension or as dry powders.

18. A process according to claim 11, wherein the blend of calcium salts, the source of glucuronic acid, and a carrageenan, are combined, co-dried to form a powder and then added to the foodstuff.

19. A fortified foodstuff comprising a fortifying amount of a balanced blend of soluble and insoluble calcium salts together with gum arabic and a carrageenan, wherein the soluble and insoluble calcium salts are present in a weight ratio of from 1:3 to 3:1 and in an amount of from 0.05 to 5% by weight, the amount of gum arabic is from 0.05 to 2.5% by weight, and the carrageenan is present in an amount of from 0.0005 to 0.1 % by weight, each weight being based on the weight of the foodstuff.

* * * * *